Patented Dec. 9, 1947

2,432,478

UNITED STATES PATENT OFFICE 2,432,478

SYNTHESIS OF METHIONINE

Herbert S. Lecky, Wilmington, Del., assignor to E. I. du Pont de Nemours & Company, Wilmington, Del., a corporation of Delaware No Drawing. Application September 26, 1945, Serial No. 618,782

6 Claims. (Cl. 260—534)

This invention relates to the synthesis of methionine, and more particularly to improvements in the hydrolysis of alpha-amino-gamma-methylmercaptobutyronitrile, whereby increased yields of methionine are obtained.

The classical method for the synthesis of methionine is the method disclosed by Barger and Coyne (Biochem. J. 22, 1417-25 (1928)). According to that well-known procedure, beta-methylmercaptopropionaldehyde is subjected to a Strecker synthesis, by means of which methionine is obtained in yields which average about 6% of the theoretical. In the copending application of W. F. Gresham and C. E. Schweitzer, S. N. 522,966, filed February 18, 1944, an improved synthesis of methionine is disclosed in which acrolein is reacted with methyl mercaptan in the presence of charcoal or an amine catalyst, and the resulting product is treated with HCN to form beta-methylmercaptopropionaldehyde cyanhydrin. The latter compound is then subjected to amination by means of high pressure ammonia, and the resulting alpha-amino-gamma-methylmercaptobutyronitrile (hereinafter called methionine nitrile) is hydrolyzed to give methionine. Each step in the synthesis of Gresham and Schweitzer gives a virtually quantitative yield with the exception of the hydrolysis step; hydrolysis of methionine nitrile by various methods, such as by prolonged heating with dilute sulfuric acid, followed by neutralization of the hydrolysis product with lime, gives yields of only 70 to 75%.

An object of this invention is to provide an improved process for the hydrolysis of methionine nitrile to methionine. Other objects and advantages of the invention will be apparent from the following specification.

It has been discovered in accordance with this invention that methionine has a remarkable tendency to become firmly united, or occluded, with calcium sulfate. This invention involves the discovery that excessive losses which are normally encountered in the separation of methionine from calcium sulfate-containing hydrolysis products of methionine nitrile can be avoided by means of a technique to be hereinafter described, which suppresses the occlusion of methionine on calcium sulfate.

Briefly stated, this invention contemplates hydrolyzing methionine nitrile with dilute aqueous sulfuric acid, introducing the resultant hydrolysis mixture into a slurry of slaked lime while maintaining the pH of the slurry at about 11, whereby the sulfate ions present are converted to calcium sulfate, adjusting the pH of the resulting mixture to about 3 to 4, and thereafter removing the resulting calcium sulfate by filtration. Preferably the filtration should be conducted at a temperature of about 90° to 100° C. Under these conditions, the occlusion of methionine on the calcium sulfate is almost completely suppressed, and yields of about 80 to 90 per cent or higher are thus obtained in the conversion of methionine nitrile to methionine.

The invention is illustrated further by means of the following examples.

*Example 1.*—(Showing the excessive loss of methionine due to occlusion on calcium sulfate.) Methionine nitrile (weight 8 pounds, 79.5% pure, prepared by reaction of beta-methylmercaptopropionaldehyde cyanhydrin with high pressure ammonia), water (11.9 pounds) and sulfuric acid (10.7 pounds, concentration 95% were placed in a 10-gallon Pfaudler glass-lined kettle, and the mixture was heated at the boiling point for 90 minutes. To the hot hydrolysis product in the glass-lined kettle, a slurry prepared from 8 pounds of lime (CaO) and 30 pounds of water was added slowly so as to prevent foaming. The resulting mixture was pumped into a stainless steel tank and was kept at boiling temperature for 3 hours to drive off ammonia formed by hydrolysis of the nitrile. Sulfuric acid (ca. 3 pounds, concentration 95%) was then added to bring the pH of the mixture to about 5 to 6, after which the mixture was filtered. The filter cake was thoroughly washed with water and pressed dry, after which it was found to contain 0.87 pound of occluded methionine. This corresponds to a 12% loss of methionine by occlusion with calcium sulfate, based on the total weight of methionine theoretically obtainable from the methionine nitrile.

*Example 2.*—Methionine nitrile (weight 8 pounds, same material as was employed in the preceding example), water (11.9 pounds) and sulfuric acid (10.7 pounds, concentration 95%) were placed in a 10-gallon Pfaudler glass-lined kettle and heated at boiling temperature for 90 minutes. The hot acidic hydrolysis liquor (temperature, 90° to 100° C.) was added slowly to an agitated mixture obtained by slaking 8 pounds of lime (CaO) in 209 pounds of water. The resulting mixture had a pH of 11, and contained a relatively dense calcium sulfate precipitate. The heating of the mixture was continued until all of the excess ammonia had been removed. The pH was then adjusted to 3 to 4 by addition of sulfuric acid, after which the calcium sulfate was filtered from the hot solution. The filter cake was washed and dried, after which it was analyzed for nitrogen. The amount found was 0.055%, which corresponds to a maximum methionine yield loss of 1.3%, based on the amount of methionine theoretically obtainable from the methionine nitrile.

The above examples are illustrative only and are not intended to limit the invention in any way. The conditions of temperature, pressure, and reaction time may be varied somewhat without losing the advantages of the invention as set forth above. Generally, however, the hydrolysis of methionine nitrile should be conducted at a temperature of about 70° to 150° C., preferably 90° to 120° C. The sulfuric acid employed in the hydrolysis should be dilute, and preferably should have a concentration of about 40 to 60%. Preferably the sulfuric acid should be present initially in excess of 2 moles per mole of nitrile. Under these conditions, the hydrolysis of the nitrile is generally complete after a reaction time of about 1 to 2 hours. There is a distinct advantage in adding the hydrolysis product to the dilute lime slurry rather than vice versa. The occlusion of methionine upon calcium sulfate according to the invention is suppressed by maintaining the methionine in a relatively dilute form during CaSO4 precipitation and by controlling the pH and temperature within the preferred range set forth above. In this manner the calcium sulfate which is removed by filtration generally contains not more than a few tenths of a per cent of methionine. Once the calcium sulfate, virtually free of occluded methionine, has been removed from the hydrolysis product by filtration, the methionine in the filtrate may be isolated by any suitable method, such as evaporation of the aqueous solvent.

While in the embodiment of the invention described in the examples, sulfuric acid is employed as the agent for controlling pH prior to filtration, it is to be understood that other suitable agents, such as phosphoric acid, oxalic acid, or the like, may be employed for this purpose if desired. In its broad aspect the method of the invention may be adapted to the suppression of occlusion of methionine on voluminous solid precipitated generally.

Since many different embodiments of the invention may be made without departing from the spirit and scope thereof, it will be understood that I do not limit myself except as set forth in the following claims.

I claim:

1. In a process for the synthesis of methionine the steps which comprise hydrolyzing methionine nitrile with dilute aqueous sulfuric acid, introducing the resulting hydrolysis mixture at a temperature of about 90° to 100° C. into a dilute slurry of slaked lime at a pH of about 11, whereby the sulfate ions present in the mixture are converted to calcium sulfate, adjusting the pH of the resulting mixture to about 3 to 4, and thereafter removing calcium sulfate virtually free of occluded methionine from the resulting mixture by filtration.

2. In a process for the synthesis of methionine the steps which comprise hydrolyzing methionine nitrile with aqueous sulfuric acid of 40% to 60% concentration, the quantity of sulfuric acid being in excess of 2 mols per mol of methionine nitrile, introducing the resulting hydrolysis mixture at a temperature of about 90° to 100° C. into a dilute slurry of slaked lime at a pH of about 11 whereby the sulfate ions present in the mixture are converted to calcium sulfate, adjusting the pH of the resulting mixture to about 3 to 4, and thereafter removing calcium sulfate from the resulting mixture by filtration.

3. In a process for the synthesis of methionine the steps which comprise hydrolyzing methionine nitrile with aqueous sulfuric acid of 40% to 60% concentration, the quantity of sulfuric acid being in excess of 2 mols per mol of methionine nitrile, at a temperature of about 90° to 120° C., introducing the resulting hydrolysis mixture at a temperature of about 90° to 100° C. into a dilute slurry of slaked lime at a pH of about 11 whereby the sulfate ions present in the mixture are converted to calcium sulfate, adjusting the pH of the resulting mixture to about 3 to 4, and thereafter removing calcium sulfate from the resulting mixture by filtration.

4. In a process for the synthesis of methionine the steps which comprise hydrolyzing methionine nitrile with aqueous sulfuric acid of 40% to 60% concentration, the quantity of sulfuric acid being in excess of 2 mols per mol of methionine nitrile, at a temperature of about 90° to 120° C. introducing the resulting hydrolysis mixture at a temperature of about 90° to 100° C. into a dilute slurry of slaked lime at a pH of about 11 whereby the sulfate ions present in the mixture are converted to calcium sulfate, adjusting the pH of the resulting mixture to about 3 to 4 by means of sulfuric acid, and thereafter removing the calcium sulfate from the resulting mixture by filtration.

5. A process for the synthesis of methionine which comprises heating methionine nitrile with aqueous sulfuric acid of 40% to 60% concentration, the quantity of sulfuric acid being in excess of 2 mols per mol of methionine nitrile for about 1 to 2 hours at the boiling point of the mixture, adding the resulting product at a temperature of about 90° to 100° C. to a dilute slurry of slaked lime at a pH of about 11, adjusting the pH of the resulting mixture to 3 to 4 by introducing sulfuric acid, thereafter filtering calcium sulfate virtually free of occluded methionine from the resulting mixture at a temperature of 90° to 100° C., and isolating methionine from the filtrate by evaporation of the aqueous solvent.

6. In a process for the synthesis of methionine the steps which comprise heating methionine nitrile with aqueous sulfuric acid of 40% to 50% concentration for about 1 to hours at the boiling point, adding the resulting product to a mixture of water and slaked lime at a pH of about 11 and a temperature of 90° to 100° C., said aqueous lime mixture being prepared by slaking about 8 parts by weight of calcium oxide with 209 parts by weight of water, adjusting the pH of the resulting lime-treated hydrolysis product to 3 to 4 by adding sulfuric acid, and thereafter filtering from the resulting mixture at 90° to 100° C. calcium sulfate which contains not more than a few tenths of a per cent by weight of methionine, whereby a filtrate containing methionine is obtained.

HERBERT S. LECKY.

REFERENCES CITED

The following references are of record in the file of this patent:

FOREIGN PATENTS

| Number | Country | Date |
|---|---|---|
| 654,770 | Germany | Dec. 30, 1937 |
| 655,563 | Germany | Jan. 18, 1938 |